No. 660,783. Patented Oct. 30, 1900.
E. L. WAGNER.
ROPE PULLEY.
(Application filed Dec. 1, 1899.)
(No Model.) 3 Sheets—Sheet 1.

WITNESSES:
E. G. Stause
Richard Paul

INVENTOR
EMIL L. WAGNER
BY Paul Hawley
ATTORNEYS

No. 660,783. Patented Oct. 30, 1900.
E. L. WAGNER.
ROPE PULLEY.
(Application filed Dec. 1, 1899.)
(No Model.)
3 Sheets—Sheet 2.

WITNESSES.
C. G. Staude
Richard Paul

INVENTOR
EMIL L. WAGNER
BY Paul O. Hawley
HIS ATTORNEYS

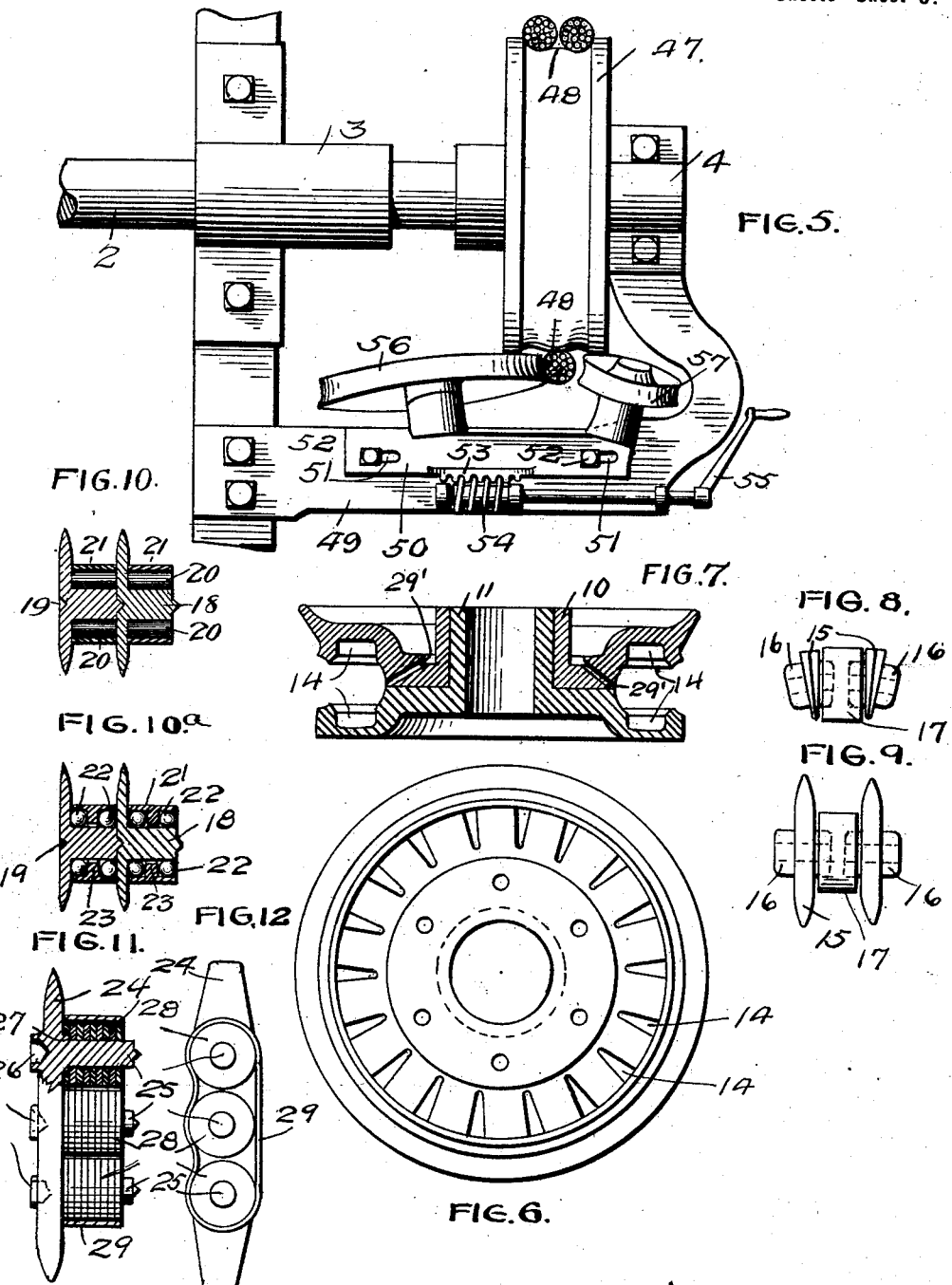

UNITED STATES PATENT OFFICE.

EMIL L. WAGNER, OF ABERDEEN, SOUTH DAKOTA.

ROPE-PULLEY.

SPECIFICATION forming part of Letters Patent No. 660,783, dated October 30, 1900.

Application filed December 1, 1899. Serial No. 738,824. (No model.)

*To all whom it may concern:*

Be it known that I, EMIL L. WAGNER, of Aberdeen, Brown county, South Dakota, have invented certain new and useful Improvements in Rope-Pulleys, of which the following is a specification.

My invention relates to pulleys designed especially for use in connection with an endless rope or cable for transmitting power from place to place; and the object of the invention is to provide a pulley of improved construction over that shown and described in Letters Patent of the United States on a similar device granted to me August 8, 1899, No. 630,760.

The invention consists generally in providing improved means for preventing the endless rope that is looped or wrapped around the peripheral face of the pulley from running off the pulley when it is driven forward or backward.

Further, the invention consists in providing improved means for supporting the antifriction devices shown in said patent in the face of the pulley.

Further, the invention consists in providing a pulley of such construction that it will be less expensive to manufacture, being composed of fewer parts, and hence more conveniently put together and operated.

Further, the invention consists in various constructions and combinations, all as hereinafter described, and particularly pointed out in the claims.

Figure 2:
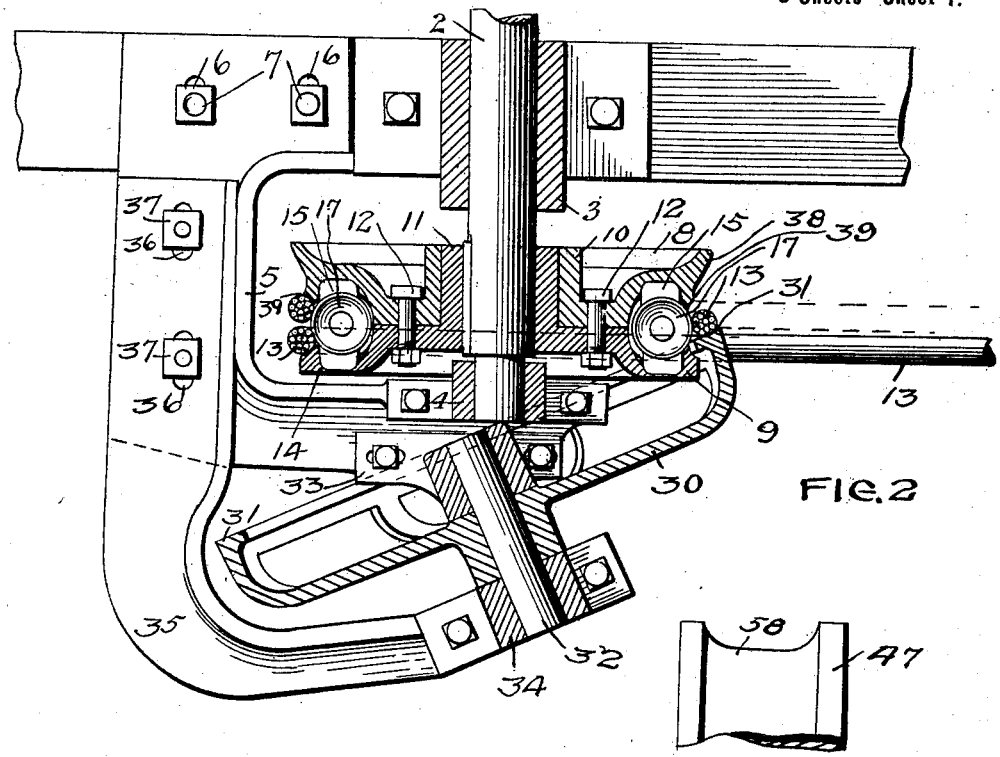
Figure 13:
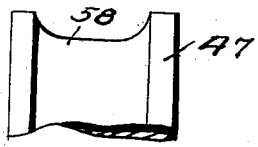
Figure 1:
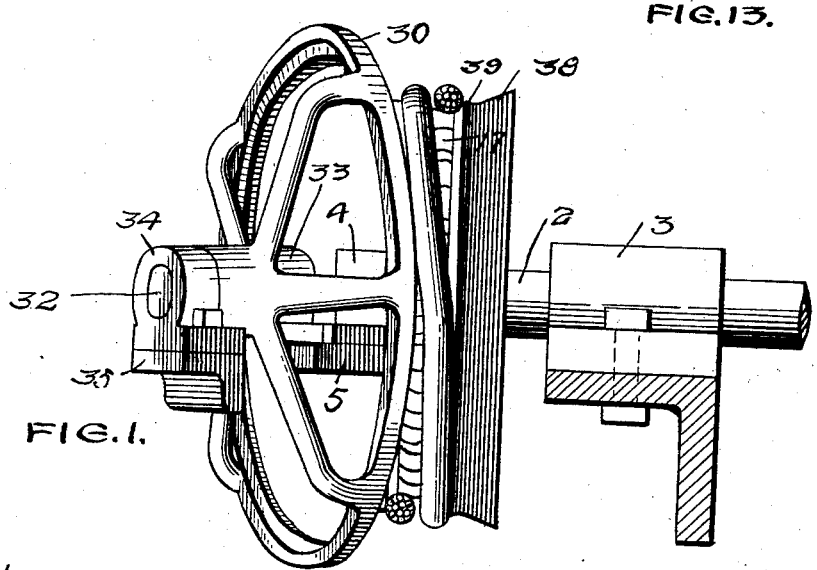
Figure 3:
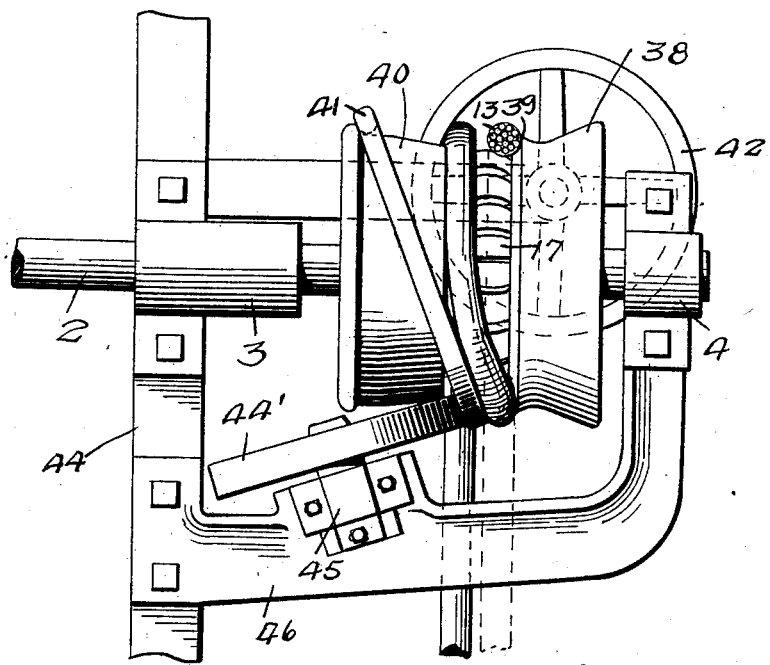
Figure 4:
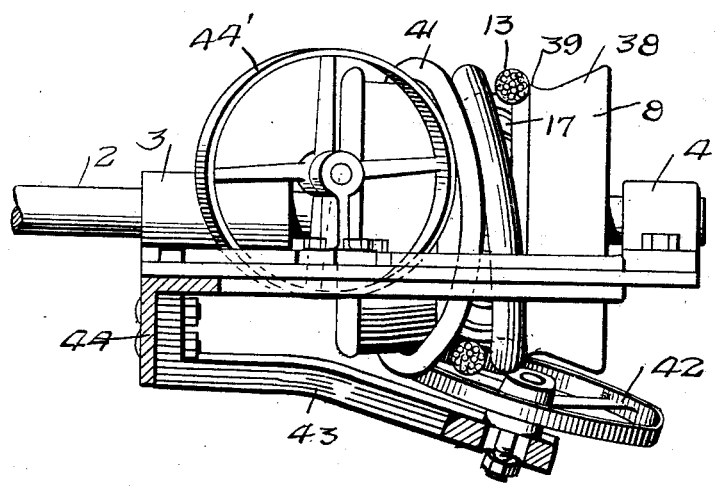

In the accompanying drawings, forming part of this specification, Figure 1 is a front elevation of a pulley embodying my invention. Fig. 2 is a sectional view of the same. Fig. 3 is a plan view of a modified construction. Fig. 4 is a front elevation of the same. Fig. 5 is a plan view of still another modification. Fig. 6 is a view of one member or side of the pulley. Fig. 7 is a sectional view of the pulley. Figs. 8, 9, 10, and 10ª are details of the antifriction devices provided in the face of the pulley. Figs. 11 and 12 are modifications of the same. Fig. 13 is a detail showing the pulley without the annular rib in the middle of its face.

In the drawings, 2 represents a shaft supported in bearings 3 and 4, the latter being arranged upon a bracket 5, having slots 6, wherein bolts 7 are arranged to render the bearing adjustable with respect to the shaft. Upon said shaft I arrange the pulley, of wood or metal, as may be preferred, comprising two round disk-shaped parts or members 8 and 9, the former having a hub 10 upon its outer face and a round central opening to receive the hub 11 provided on the inner face of the part 9. These parts are preferably of cast metal, and the hubs having been fitted may be secured together by bolts 12 or in any other suitable way, the hub 11 being locked upon the shaft by a suitable key. Between the parts 8 and 9 is a space extending from the circumference of said parts to their hubs, and within said space I prefer to arrange a series of antifriction devices in a circle around and forming a portion of the peripheral face of the pulley, and over which the looped portion of the rope or cable 13 slides laterally as the pulley revolves. To support the antifriction devices, I provide a series of sockets 14 in the abutting faces of the members 8 and 9, said sockets being arranged at intervals in a circle within the face of the pulley and adapted to receive the tapered ends of blocks 15, having hubs 16 upon each side to enter sockets in the sides of the antifriction wheels or rollers 17, that are arranged between said blocks 15, and whose axes are therefore substantially at right angles to the axis of the pulley wherein said blocks are supported. These blocks, as shown in Fig. 8, are wedge-shaped in vertical section to permit them to conform to the circumference of the pulley and when placed in position and the parts 8 and 9 bolted together the antifriction-rolls will be firmly secured, while permitted to revolve freely on their axes as the rope or cable slides back and forth over the face of the pulley.

In Fig. 10 I have shown a modified construction of the antifriction devices, which consists in providing the block with a hub 18 upon one side instead of upon both sides, as described with reference to Figs. 8 and 9, said hub having a pointed end to enter a notch or recess 19 in the abutting face of the adjoining block. Upon said hub I may arrange a series of rollers 20, held in place by a short sleeve or ring 21, adapted to revolve over said rollers and form an antifriction-bearing for the rope or cable. Instead of using the rolls I may provide a series of balls 22 (see Fig. 10ª) at each end of the ring, in which case I prefer to provide an annular flange or rib 23 upon the interior of the ring between the rollers or balls to hold them against the faces of the adjoining blocks and permit the ring to revolve freely between them. In place of using ball-bearing rollers or wheels I may provide blocks 24, (see Fig. 11,) having on one side a series of studs 25, provided with pointed ends to enter recesses or notches 26 in the face of the adjoining block and also provided with reinforcing-hubs 27. Upon these studs I arrange a series of washers 28, the inner washer of each series having a larger central opening than the others of that series to permit it to slide over the hub 27 and all of said washers being freely revoluble on said studs to reduce the friction of the rope as it slides laterally over the pulley. I have shown in Fig. 11 three studs, with as many rows of washers arranged thereon, but obviously a greater or less number may be employed, according to the width of the face of the pulley.

In Fig. 12 I have shown a small belt 28 on the rows of washers, and I may prefer to use this belt in connection with the antifriction devices shown in Fig. 11 to render the face of the pulley smoother and less likely to wear the rope or cable. I prefer to provide a series of holes 29' near the hub of the pulley, leading to the space beneath the antifriction devices and through which their bearings may be oiled. The rope or cable is wrapped or looped around the pulley in the manner described in my patent referred to above, and, as fully set forth in said patent, it is necessary to provide means preventing the rope from running off either the right or left hand side of the pulley, according to the direction it is being driven. Heretofore I have used two wheels arranged in front of the pulley, one upon each side of the loop and engaging it, respectively, according as the pulley is driven forward or backward. In my present construction, however, I may dispense with one of these wheels entirely and in place of the other provide a dish-shaped wheel 30, having a flat-surfaced rim 31 to engage the rope. This wheel revolves in a plane at an acute angle to the vertical plane of the pulley and has in consequence a longer bearing-surface on the rope, causing it to make a less abrupt bend in crossing the face of the pulley and with less friction than when the wheel is arranged in front. The wheel is preferably mounted on a shaft 32, whose axis is at an angle to the axis of the pulley and is supported at its inner end in adjustable bearings 33 and at its outer end in a bearing 34, that is supported on a bracket 35, provided with slots 36, through which bolts 37 pass and adjustably secure it to the bracket 5. This construction permits the angle of the wheel 30 with respect to the pulley to be changed at will and also permits the operator to adjust the parts to compensate for any slight inaccuracy in finishing or dimensions.

To prevent the rope from running off the right-hand side of the pulley when reversed, I provide a beveled or inclined face 38 on the part 8 and an annular rib or ridge 39, separating the beveled portion of the pulley-face from its middle portion or the part where the antifriction devices are usually located. When the pulley is driven backward, the rope will run up over the rib 39 and each time the pulley is revolved will be a distance nearer its right-hand edge corresponding to the diameter of the rope; but as fast as the rope travels up the inclined surface it will slide back again against the rib 39 and will thus be prevented from running off the pulley. This construction enables me to dispense with one of the wheels in front of the pulley, as stated above.

In Figs. 3 and 4 I have shown a modified means for retaining the rope or cable on the pulley, which consists in providing a wide beveled face 40 on the opposite side from the beveled face 38 and arranging thereon a loosely-fitting ring 41, of metal or other suitable material, one portion of which is engaged and held upon the top of the inclined surface 40 by a wheel 42, adjustably supported at an incline on a bracket 43, that is bolted to the frame 44, beneath and at the rear of the pulley. This ring has a flat face on one side to bear against the rope or cable, while its opposite side is engaged by a wheel 44', supported in bearings 45 on the bracket 46. The ring 41 travels around and with the pulley in a plane at an acute angle to its vertical plane and having a greater bearing-surface on the rope causes it to travel diagonally across the pulley instead of abruptly, as it would if engaged directly by the wheel 44', thus reducing friction and consequent wear on the rope. When this form of pulley is reversed, the rope will run upon the beveled surface at the end opposite the surface 40, as described with reference to the pulley shown in Figs. 1 and 2.

In Fig. 5 I have shown still another modification, which consists in providing a pulley 47, having a grooved peripheral face wherein the loops of the rope or cable run and a rib or raised central portion 48 between the loops of the rope, preventing the same from rubbing together. In this construction I have dispensed with the antifriction devices, the rib being made smooth to permit the rope to slip easily from one side to the other. In front of the pulley is a bracket 49, whereon a plate 50 is arranged, having slots 51 to receive bolts 52, whereby said plate is rendered longitudinally adjustable, and on one edge of said plate is a rack 53, engaged by a worm 54, operated by a crank 55. Upon the inner edge of said plate are studs whereon are mounted wheels 56 and 57, both having grooved or concave faces, the former engaging the rope to direct it across the rib 48 as the pulley is driven forward and the latter to prevent the rope from running off the right-hand side of the pulley when reversed. This construction enables me to adjust the wheel 57 when the pulley is reversed, so that it will occupy the same relative position with respect to the periphery of the pulley as the wheel 56 when the pulley is driven forward, thus preventing any grinding between the rope and wheel. If preferred, the wheels 56 and 57 may be provided with flat faces, which will render their adjustment with respect to the rope or cable less difficult.

In Fig. 13 I have shown a section of a pulley having a grooved or substantially concave face 58, corresponding to the groove described with reference to the pulley 47, except that the central rib or ridge is omitted, leaving the bottom flat, as shown.

The manner of using my improved pulley is as follows: The rope or cable having been placed in position, the pulley is revolved, and the wheel 30 or the ring 41, engaging the loop or wrap in the cable, directs it across its grooved or concave face over the antifriction devices therein and prevents it from running off the end of the pulley as it is revolved. When the direction of the pulley is reversed, the rope will run up onto the beveled end thereof and will be prevented from traveling off the side of the pulley by the smooth inclined surface, the loop or wrap in the rope slipping back against the annular rib as fast as it travels up the incline.

Instead of using a rope or cable I may employ a suitable chain adapted for use with any size of pulley, particularly the smaller sizes, where a rope or cable is liable to become worn or broken by making too short a turn around its pulley.

Obviously the construction that I have described may be modified in many ways by any one skilled in the art, and I therefore do not wish to be confined to the details herein set forth.

Having thus described my invention, I claim as new and desire to secure by Letters Patent—

1. The combination, with a pulley, of an endless rope or cable having a loop or wrap about the peripheral face of the pulley, and adjustable means engaging said loop to direct it across without leaving the face of the pulley as it revolves.

2. The combination, with a pulley having an antifriction-surface in its peripheral face, of an endless rope or cable having a loop around said face and adjustably-supported means engaging said loop to direct it across the face of the pulley over the antifriction-surfaces therein as the pulley revolves.

3. The combination, with a pulley, of an endless rope or cable looped or wrapped about its peripheral face, and means revolving in a plane at an acute angle to the vertical plane of said pulley and engaging the loop thereon to direct it across without leaving said peripheral face as the pulley revolves.

4. The combination, with a pulley having an annular rib or ridge in its peripheral face, of an endless rope or cable looped or wrapped about said face, and means revolving in a plane at an acute angle to the vertical plane of said pulley and engaging the loop thereon to direct it across said peripheral face as the pulley revolves.

5. The combination, with a pulley having antifriction means in its peripheral face, of an endless rope or cable looped or wrapped about said face, and means revolving in a plane at an acute angle to the vertical plane of said pulley and engaging the loop thereon to direct it across without leaving said peripheral face as the pulley revolves.

6. The combination, with a pulley, having a series of antifriction devices in its periphery, the axes of said antifriction devices being substantially at right angles to the axis of said pulley and their circumferences projecting above the face of said pulley and forming an annular rib or ridge thereon, of an endless rope or cable looped or wrapped about said periphery, and means revolving in a plane at an acute angle to the plane of said pulley and engaging the loop thereon to direct it across without leaving said periphery as the pulley revolves.

7. The combination, with a pulley, of an endless rope or cable looped or wrapped about its peripheral face, means revolving in a plane at an acute angle to the vertical plane of said pulley and engaging the loop thereon to direct it across said peripheral face as the pulley revolves, and an inclined or beveled surface provided on said pulley and whereon said rope runs when the pulley is reversed, substantially as described.

8. The combination, with a pulley, of an endless rope or cable looped or wrapped about its peripheral face, means engaging the loop to direct it across the face of the pulley as it revolves and said pulley having an inclined or beveled face whereon said rope runs when the pulley is reversed, substantially as described.

9. The combination, with a pulley, of an endless rope or cable looped or wrapped about its peripheral face, means revolving in a plane at an acute angle to the vertical plane of said pulley and engaging the loop thereon to direct it across said peripheral face as the pulley revolves, an inclined or beveled face provided on said pulley, and an annular rib or ridge provided on said beveled face, for the purpose specified.

10. The combination, with a pulley, having antifriction devices in its peripheral face and an annular beveled or inclined surface at one end, of an endless rope or cable looped or wrapped around said face over the antifriction devices therein, means engaging the loop to direct it across said face over said antifriction devices as the pulley revolves, and said rope or cable being adapted to run upon said beveled or inclined surface when the pulley is reversed, substantially as described.

11. The combination, with a pulley, having an antifriction peripheral face, of a rope or cable having a loop or wrap around said face, said pulley being also provided on its face with an inclined or beveled surface whereon the rope or cable runs when the pulley is reversed, said beveled surface being separated from the antifriction-surface of the pulley by an annular rib or ridge, and a wheel 30 engaging said loop or wrap to direct it across said face, substantially as described.

12. A pulley, comprising two disk-shaped parts or members secured together and having hubs and central openings to receive a shaft and provided in their inner faces near their peripheries with a series of sockets, a series of blocks fitting within said sockets, antifriction devices supported by said blocks and forming an annular rib or ridge in the periphery of said pulley, the axes of said antifriction devices being substantially at right angles to the axis of said pulley.

13. A pulley, comprising two disk-shaped parts or members 8 and 9, means securing said parts together and both having central openings and concentric hubs, said part 8 having a beveled or inclined circumference, an annular space being formed between said beveled circumference and the circumference of said part 9 and antifriction means provided in said space and projecting above and forming a portion of the peripheral face of said pulley, for the purpose specified.

14. A pulley comprising two parts or members 8 and 9 having central openings and telescoping hubs, means securing said parts together, one of said parts having a beveled or inclined circumference, a space being provided between said beveled circumference and the circumference of the opposite part or member, a series of blocks arranged in a circle in said space transversely with respect to the face of the pulley, and antifriction wheels or rollers mounted in bearings in said blocks and having their circumferences projecting above and forming a portion of the periphery of said pulley, substantially as described.

In witness whereof I have hereunto set my hand this 26th day of November, 1899.

EMIL L. WAGNER.

In presence of—
RICHARD PAUL,
M. C. NOONAN.